United States Patent [19]

Delius et al.

[11] Patent Number: 4,470,634
[45] Date of Patent: Sep. 11, 1984

[54] VEHICLE SEAT, PARTICULARLY FOR AIRPLANES AND OMNIBUSES

[75] Inventors: Kurt Delius; Vojtech Demovic, both of Kirchheim; Karl Schmidhuber, Nürtingen-Rossdorf, all of Fed. Rep. of Germany

[73] Assignee: Keiper Recaro GmbH & Co., Fed. Rep. of Germany

[21] Appl. No.: 287,638

[22] Filed: Jul. 28, 1981

[30] Foreign Application Priority Data

Aug. 6, 1980 [DE] Fed. Rep. of Germany ....... 3029734

[51] Int. Cl.³ .............................................. A47C 7/50
[52] U.S. Cl. .................................... 297/429; 297/430
[58] Field of Search ............... 297/430, 429, 431, 432

[56] References Cited

U.S. PATENT DOCUMENTS

| | | | |
|---|---|---|---|
| 513,169 | 1/1894 | Armstrong | 297/430 X |
| 2,151,729 | 3/1939 | Baker | 297/430 X |
| 2,169,550 | 8/1939 | Arends | 297/430 X |
| 2,484,803 | 10/1949 | Bell et al. | 297/432 |
| 2,602,490 | 7/1952 | Earl | 297/430 |
| 3,794,381 | 2/1974 | Coldemeyer | 297/430 |

*Primary Examiner*—Francis K. Zugel
*Attorney, Agent, or Firm*—Wigman & Cohen

[57] ABSTRACT

A vehicle seat, particularly for airplanes or omnibuses and the like, wherein the seat is equipped with a retractable leg support which can be extended to provide a support for the legs of the user of the vehicle. In contrast to known seats of this type, the leg rest can be securely stopped and held in any intermediate position of the leg support between the two end positions. This is accomplished by means of a cog and chain or belt strand connected with drive means and a self-arresting gearing arrangement.

5 Claims, 3 Drawing Figures

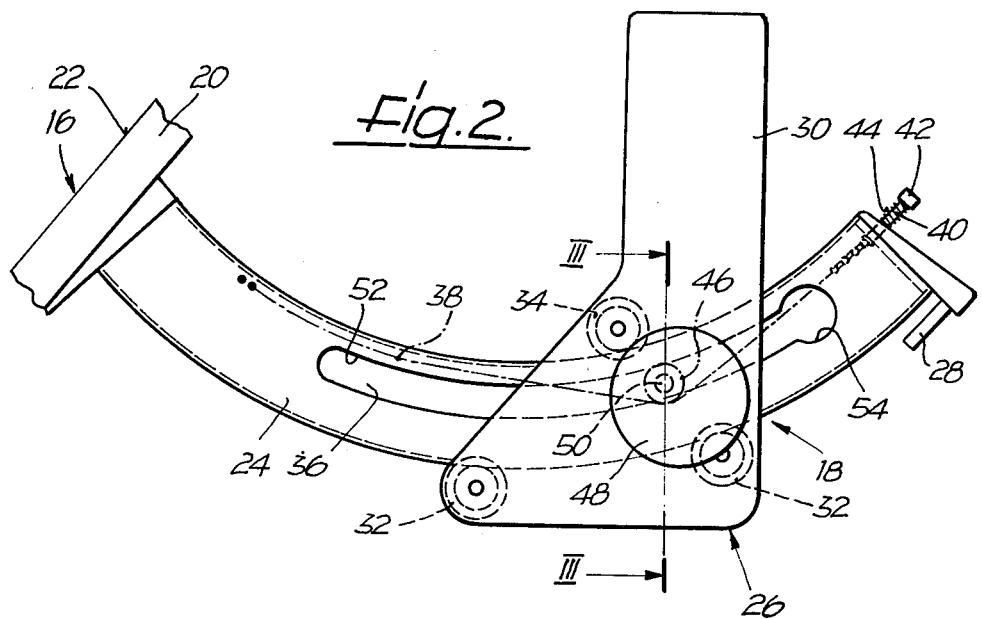
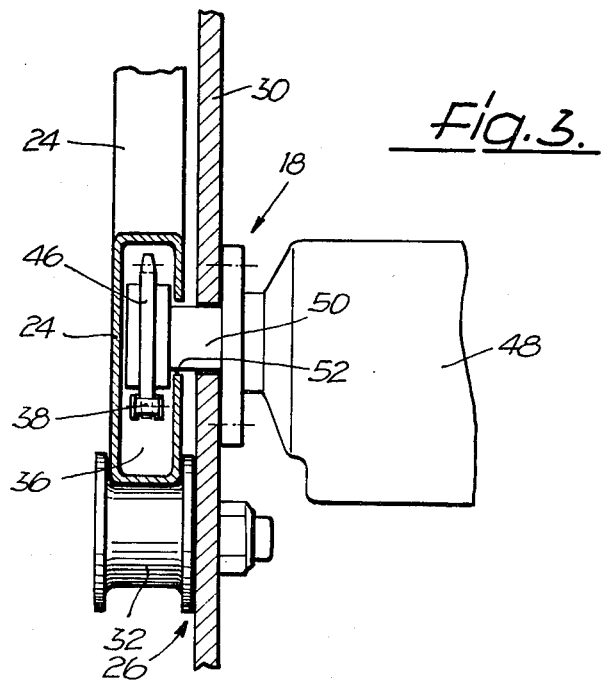

VEHICLE SEAT, PARTICULARLY FOR AIRPLANES AND OMNIBUSES

BACKGROUND OF THE INVENTION

The invention relates to a vehicle seat, particularly for airplanes and omnibuses, having a leg support which can be adjusted between a lowered position where it projects only slightly, if at all, beyond the forward edge of the seat and an extended position where it offers a leg support surface in front of the seat and which is secured at least in these two positions against any shifting toward the extended or lowered position and, further, which has at least one support bar which is movable along its straight or arcuate longitudinal center line on a guide element arranged on the seat frame.

In the two leading seats of this type, which are taught in the two German patent publication Nos. 29 19 715 and 29 33 160, which were published after Aug. 5, 1980, the leg support is locked in its extended position and in some cases also in its lowered position by means of a locking device which can be manually or hydraulically activated. No setting in intermediate positions is provided, even though individual seat users may find other positions to be more comfortable, as when, for example, their calves are supported in a steeper position.

OBJECT AND SUMMARY OF THE INVENTION

The object of the invention is to provide a vehicle seat with leg supports which can be easily set in as many positions as possible between its lowered position and its extended position, thus allowing a comfortable change of position.

This object is achieved according to the invention with a vehicle seat of the above-described type by a drive mechanism having a self-arresting gearing arrangement which secures the leg support in any position between the lowered position and the extended position against any shifting in the direction of either of the two end positions.

The drive mechanism can include a hand grip or a motor which, by selection of the seat manufacturer, sets the gearing arrangement in motion as soon as, and as long as the seat user desires it, in order to accomplish any desired change in the position of the leg support, which will then securely stop in the achieved intermediate or end position.

In one preferred embodiment of the vehicle seat according to the invention the bar drive includes a link or toothed flexible strand arranged adjacent the bar and a toothed cog arranged on a drive shaft which provides the torque, which wheel is in driving engagement with the strand. This provides in the simplest manner a transformation of the rotary movement of the drive shaft into the shifting movement of the support bar.

The support bar of the preferred embodiment includes a hollow chamber. In addition, this embodiment is distinguished by the fact that the hollow chamber contains both the strand and the toothed cog and is open to the outside via a longitudinal slot, through which the drive shaft supporting the toothed wheel passes; and by the fact that the drive is arranged next to the guide element. The arrangement of the strand and the toothed cog in the hollow support bar saves structural space and provides a protected location for the strand and the toothed cog, which also prevents any danger of injury to the seat user.

The support bar in the prefered embodiment is formed in the shape of a sickle. In addition, this embodiment is distinguished by the fact that the flexible strand runs along the convex inner side of the hollow chamber in the bar and is provided with a tightening device to maintain tension in the strand which is deflected by the toothed cog, independently of the position of the curved support bar relative to the guide element. This arrangement and tensioning of the strand improves and assures the driving engagement of the toothed wheel therewith.

In the preferred embodiment the tightening device includes a tightening screw which passes through the rear end of the support bar and engages the rear end of the strand. The shaft of this tightening screw carries an helical spring, one end of which abuts the rear end of the bar and the other end of which abuts a nut threaded onto the shaft. This construction of the tightening device is simple and effective, as is the overall preferred embodiment, which is characterized by lower construction cost, simpler mounting and lower weight than other possible embodiments.

The provision of a chain as the strand in the preferred embodiment has, in comparison with a toothed belt, the decided advantage that the engagement of the toothed cog in the strand is consistently deep, i.e., reliable, and low in friction.

The invention is described below in greater detail with the aid of the drawings of the preferred embodiment of the vehicle seat according to the invention.

BRIEF DESCRIPTION OF THE DRAWINGS

FIG. 2 is an enlarged side view of a support bar of the embodiment with a portion of its drive mechanism; and FIG. 3 is a fragmentary vehicle section taken along line III—III of FIG. 2.

DETAILED DESCRIPTION OF THE PREFERRED EMBODIMENT

Figure 1:
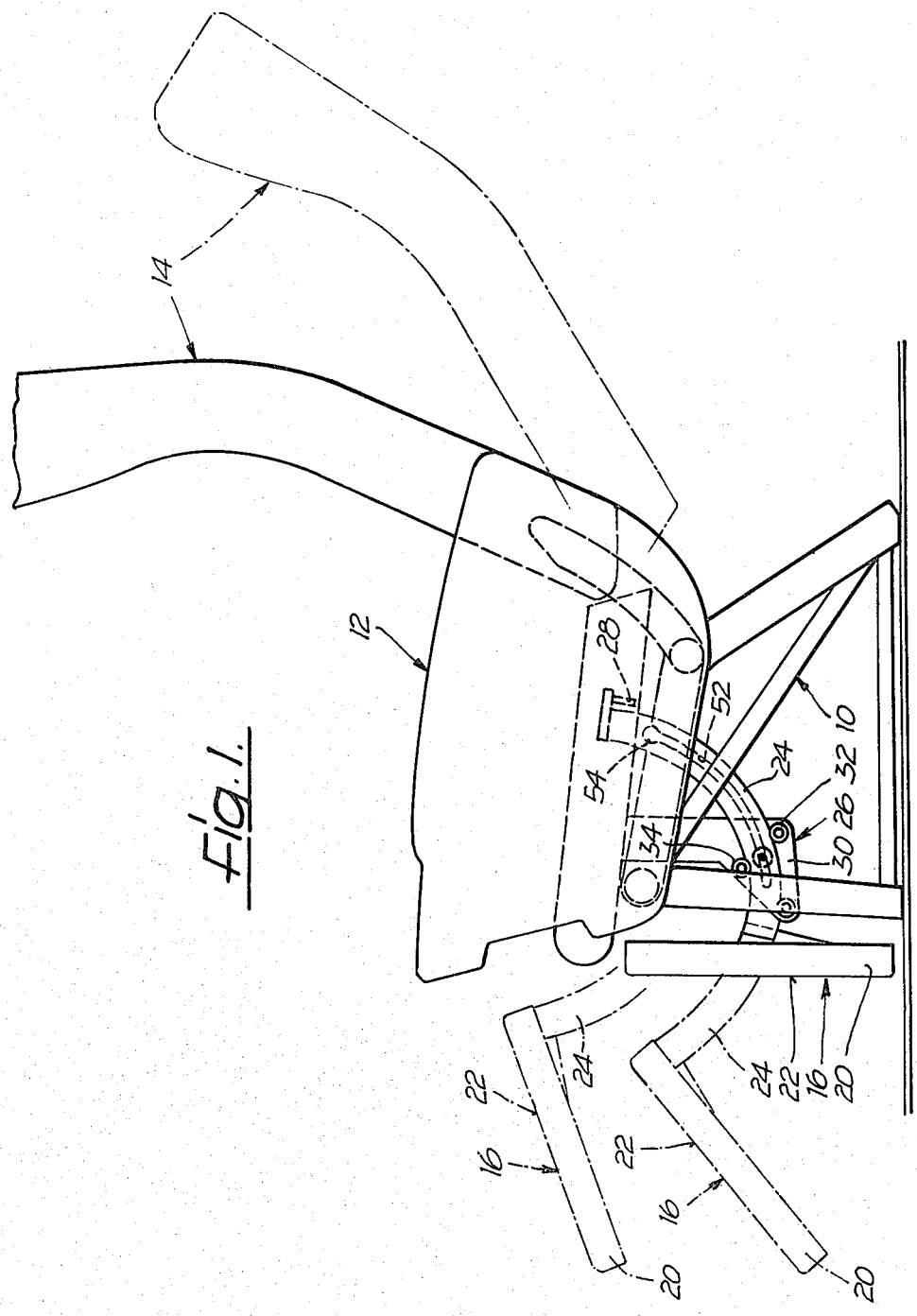
FIG. 1 is a partial schematic side view of the embodiment.

The exemplary embodiment consists primarily of a seat frame 10 anchored to the floor of the vehicle, a lower seat element 12 supported by the frame, a back rest 14 hinged to the frame, a movable leg support 16 and a drive mechanism 18 (FIG. 2) for the movable leg support.

The leg support 16, in turn, consists primarily of an upholstered plate 20 having a leg support surface 22 and two identical support bars 24 which are arranged in parallel vertical planes and are guided so as to be movable along their arcuate longitudinal center lines on respective guide elements 26 disposed on the seat frame 10. The two support bars 24, which are shaped like sickles, are four-sided tubes, the concave outer sides of which are directed upward and the front ends of which support the plate 20 in such a manner that depending on its position, the plate can be moved up and down, i.e., back and forth. The rear ends of the two support bars 24 are each provided with a stop element 28 which cooperates with its associated guide element 26.

Each of the two guide elements 26 is equipped with two rollers 32 arranged beneath said guide element and with one guide roller 34 arranged above said guide element. These guide rollers are free wheeling and roll against the respective underside or concentric upper side of the guided support bar 24 respectively. Accordingly, each roller 32 or 34 has two flanges or ribs which guide the two parallel wide sides of the support bar 24 between them.

A chain 38 is mounted within the hollow chamber 36 in one of the two support bars 24. The forward end of the chain is hingedly connected to the inside upper surface of the support bar and the rear end thereof is provided with a screw 40, which is mounted so as to be movable in its longitudinal direction. Outside of the bar, the screw 40 carries a nut 42 as well as helical spring 44. One end of the helical spring 44 abuts the rear end of the support bar 24 and the other end abuts the nut 42. The screw 40, nut 42 and helical spring 44 form a device for tightening the chain 38, which is diverted about a toothed cog 46 of the drive mechanism 18, of which the chain 38 also comprises a part.

The drive mechanism 18 also includes an electric motor (not shown) which can be engaged by the user of the seat by means of a switch (not shown) arranged on the seat 12 and a self-arresting reduction gearing arrangement 48 which is also connected with the motor and is flanged to the support 30 of the driven support bar 24. The torque-producing shaft 50 of this reduction gearing arrangement 48 supports the toothed cog 46, the teeth of which engage in the intermediate spaces between the chain links. The transmission shaft 50 passes through a slot 52 which runs along the arcuate longitudinal center line of the support bar 24 and provides an opening to the hollow chamber 36. At its rear end this slot 52 is widened to enable the toothed cog 46 to enter therethrough.

Of course, the driven support rod 24, the rollers 32 and 34 which guide it, the chain 38 and the toothed cog 46 are arranged on one side of the support 30 associated therewith, while the drive mechanism 48 (and the electric motor) are arranged on the other side of the support, as seen in FIG. 3.

The leg support 16 can be adjusted between a lowered position, which is indicated in FIG. 1 with full lines, where it does not project forward beyond the seat element 12, and any number of desirable extended positions, two of which are indicated with broken lines in FIG. 1 and where it offers a leg support surface 22 in front of the seat 12. Owing to the self-arresting character of the reduction gearing arrangement, the leg support 16 is protected against an unintentional adjustment, both in its lowered position and its most extended position, which is determined by the stop of the element 28 abutting its associated rear guide roller 32, as well as in all intermediate use positions. In the extreme extended position the slot expansion 54 and the toothed cog 46 align with each other.

To adjust the leg support 16, the shaft of the electric motor is caused to rotate in one direction or the other, whereby the toothed cog 46, which rotates significantly more slowly, exerts a pulling force on the chain 38, thus moving the driven support bar 24 until the desired position of the leg support 16 is reached, such as the extreme position where the drive shaft 50 abuts the forward end of the slot 52. Of course, two end switches can be provided for the electric motor which automatically turn it off when one of the two end positions of the leg support 16 is reached, as determined by the stops.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat for airplanes, buses and the like, comprising:
    a seat frame;
    a leg support adjustable between a lowered end position, where it lies substantially flush with the front edge of said seat, and an extended end position, where it offers a leg support surface in front of said seat;
    at least one guide element mounted on said seat frame;
    at least one support bar movable along its longitudinal center line on said guide element and rigidly connected with said leg support, said support bar being arcuate in shape;
    a drive means for shifting said support bar; and
    a self-arresting gearing means connected to said drive means for securing said leg support in any desired position between its extended and lowered end positions, whereby said leg support is prevented from shifting in the direction of either of said end positions, wherein said drive means comprises a flexible strand arranged adjacent said support bar, a torque-producing drive shaft and a toothed cog mounted on said drive shaft in driving engagement with said strand.

2. A vehicle seat for aiplanes, buses and the like, comprising:
    a seat frame;
    a leg support adjustable between a lowered end position, where it lies substantially flush with the front edge of said seat, and an extended end position, where it offers a leg support surface in front of said seat;
    at least one guide element mounted on said seat frame;
    at least one support bar movable along its longitudinal center line on said guide element and rigidly connected with said leg support;
    a drive means for shifting said support bar; and
    a self-arresting gearing means connected to said drive means for securing said leg support in any desired position between its extended and lowered end positions, whereby said leg support is prevented from shifting in the direction of either of said end positions;
    wherein said support bar is arcuate in shape, said drive means comprises a flexible strand arranged adjacent said support bar, a torque-producing drive shaft and a toothed cog mounted on said drive shaft in driving engagement with said strand, the side walls of said support bar define a hollow chamber enclosing said flexible strand and said toothed cog, one side wall of said support bar further defining a slot-like opening through which said drive shaft carrying said toothed cog extends, and said self-arresting gearing means being disposed adjacent said guide element.

3. Vehicle seat in accordance with claim 2, wherein said support bar is arcuate in shape and said flexible strand extends along the convex inner side of said hollow chamber and further comprising tightening means for providing tension in said flexible strand independently of the position of said arcuate support bar relative to said guide element.

4. Vehicle seat in accordance with claim 3, wherein said tightening means comprises a tightening screw, the shaft of which passes through the rear end of said support bar and engages the rear end of said strand, a nut threaded onto said shaft and an helical spring disposed about said shaft, one end of said helical spring abutting the rear end of said support bar and the other end thereof abutting said nut.

5. Vehicle seat in accordance with claim 1, 2, 3 or 4 wherein said strand is a chain.

* * * * *